United States Patent
Pearl

[11] 3,735,660
[45] May 29, 1973

[54] DEVICE FOR CUTTING SHEET MATERIAL

[75] Inventor: David R. Pearl, West Hartford, Conn.

[73] Assignee: Gerber Garment Technology, East Hartford, Conn.

[22] Filed: July 31, 1970

[21] Appl. No.: 59,899

[52] U.S. Cl. ............83/560, 83/374, 83/398, 83/562, 83/659, 83/925 CC
[51] Int. Cl. ............B23d 27/00, B26d 7/20
[58] Field of Search............83/398, 528, 559–562, 83/659, 925 CC, 556, 374, 71; 30/273, 274, 275

[56] References Cited

UNITED STATES PATENTS

| | | | |
|---|---|---|---|
| 245,150 | 8/1881 | Fowler | 83/658 UX |
| 3,338,125 | 8/1967 | Casey | 83/659 X |
| 3,495,492 | 2/1970 | Gerber et al. | 83/374 |
| 3,589,222 | 6/1971 | Sederberg | 83/925 CC |
| 3,548,502 | 12/1970 | Baldwin | 83/925 CC |
| 3,511,124 | 5/1970 | Bruns | 83/925 CC |
| 3,548,699 | 12/1970 | Gerber | 83/925 CC |
| 1,172,058 | 2/1916 | Scheyer | 83/925 CC |
| 3,465,630 | 9/1969 | Bruns | 83/424 |

*Primary Examiner*—J. M. Meister
*Attorney*—McCormick, Paulding and Huber

[57] ABSTRACT

A device for cutting sheet material, such as a layup of fabric sheets spread on a cutting table, includes a cutter head movable over the table and having a vertically reciprocating knife or other similar cutting tool. The cutter head is moved by numeric control relative to the table to cause its tool to follow a desired line of cut, and associated therewith is a bottom plate which moves longitudinally of the table in unison therewith between the supporting surface of the table and the bottom layer of the material to receive the lower or distal end of the cutting tool.

13 Claims, 17 Drawing Figures

INVENTOR
DAVID R. PEARL

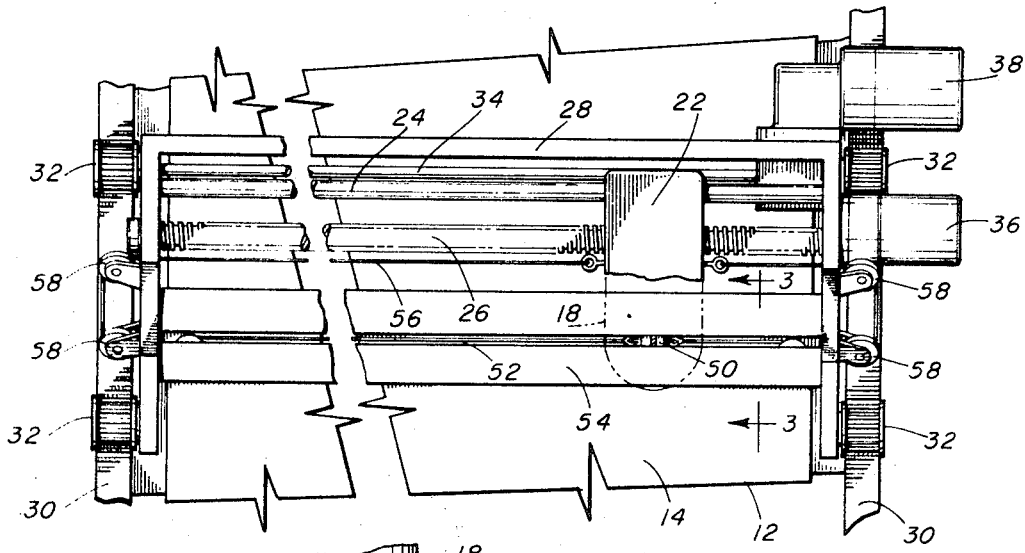
Fig. 2
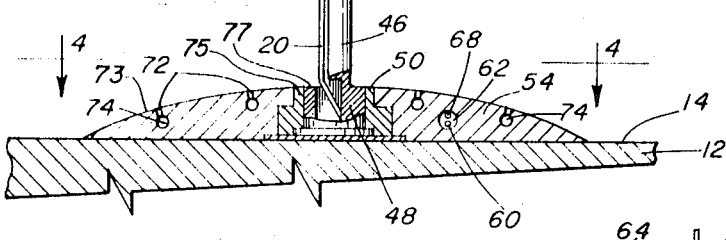
Fig. 3
Fig. 4

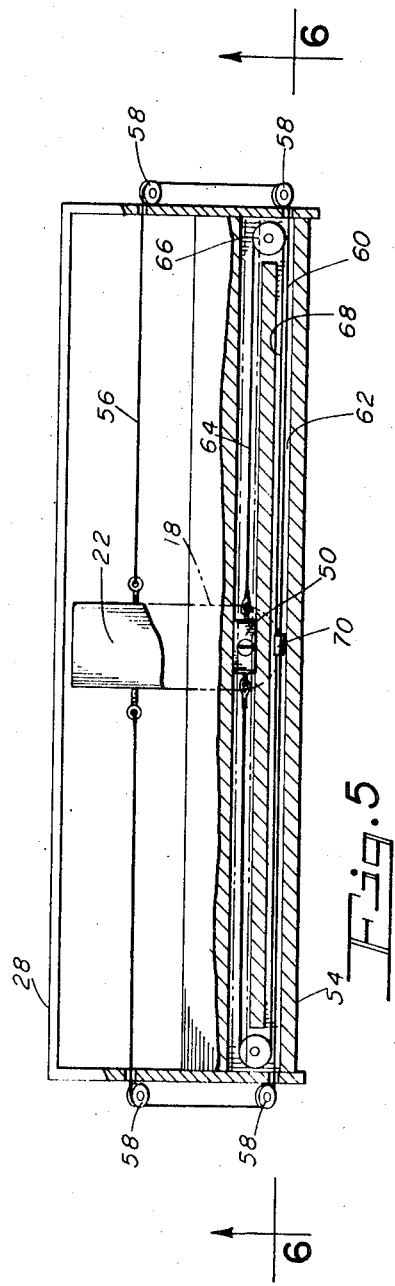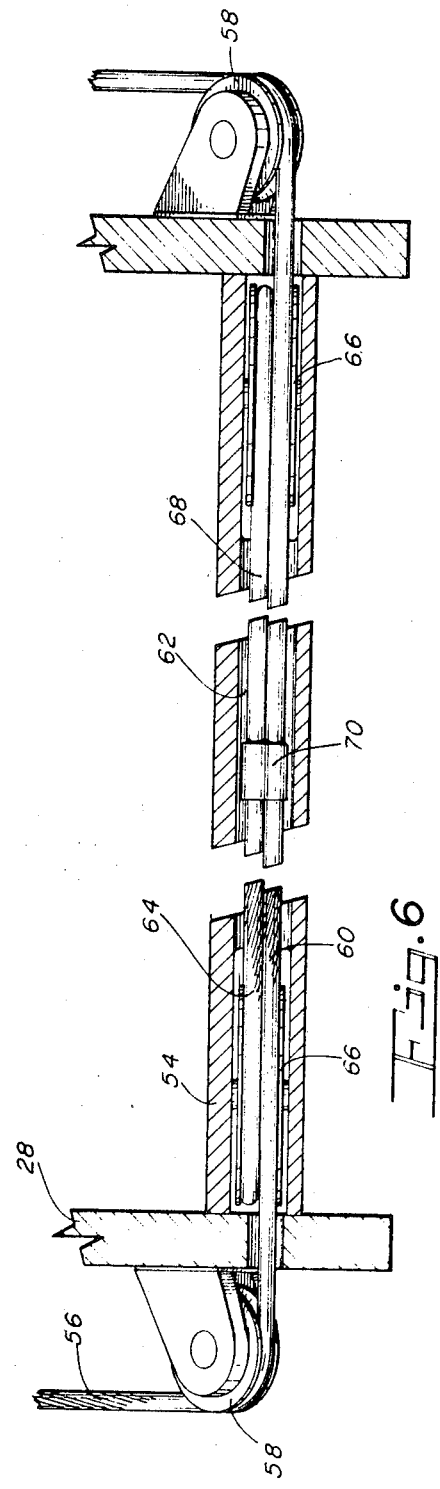

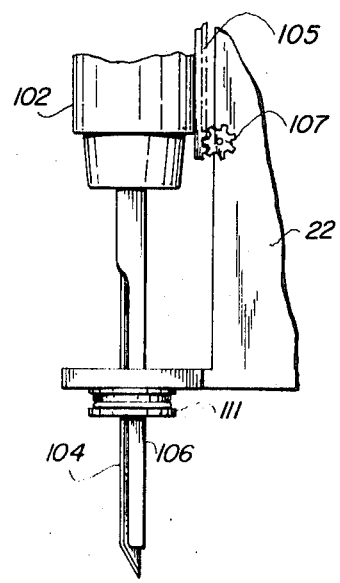
Fig. 9
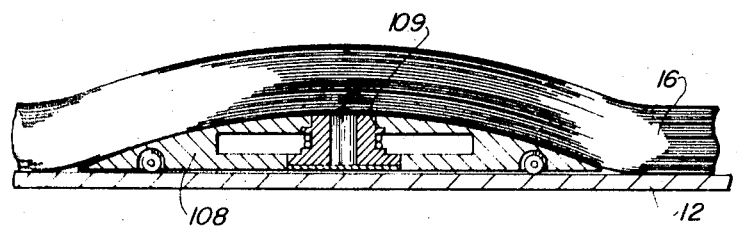
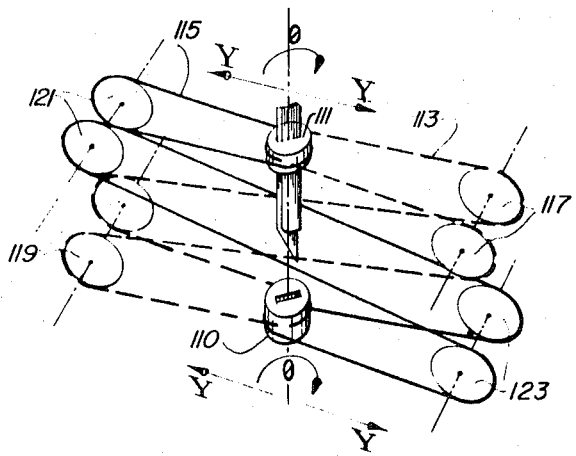
Fig. 11

DEVICE FOR CUTTING SHEET MATERIAL

BACKGROUND OF THE INVENTION

This invention relates to devices for cutting sheet material, particularly material which is by itself relatively thick or which is comprised of a large number of individually thin layers laid up on top of one another to form a relatively thick layup.

The cutting device of this invention has particular utility in the cutting of layups of fabric such as are used when making clothing, upholstery or the like, but may also be used for the cutting of various other different sheet materials. In the cutting of fabric layups it is customary to spread the fabric onto a cutting table and to then cut it by means of a hand-guided cutter including and electrically powered vertically reciprocating cutting blade. When material is cut by such a reciprocating blade, it is necessary that the blade in the lowermost extent of its stroke extend at least a small distance beyond the lower layer or surface of the material in order that the full thickness of the layup be cut. In the hand-guided cutting tool, the projection of the blade below the lower surface of the layup is accommodated by a base on the cutter which moves between the supporting surface of the table and the lower surface of the material. The base is connected to the main portion of the cutting tool, which includes the motor and other parts and which is located above the layup, by a relatively sturdy sheath which partially surrounds the blade and which extends through the slit in the fabric made by the blade.

The present invention relates to a cutting device which also uses a vertically reciprocating blade and a bottom member movable under the layup for receiving the projecting lower end of the blade but which is particularly adapted for use with a numerical controller for dictating its movement and which is not dependent on the use of a relatively sturdy sheath for moving the base in unison with the blade and the remainder of the cutter. Therefore, in the device of this invention, the blade sheath may be made of a relatively small size to make the blade capable of cutting sharp corners and of otherwise being easily maneuvered through the fabric. Alternatively, the sheath may be eliminated entirely, or at least made unconnected with the bottom member so as to be vertically movable with the blade, making it possible to execute plunging cuts with the blade to start a cut from any point in the layup rather than requiring a cut to be always started from the edge of the layup as is the case when the base or bottom member is connected to the upper portion of the cutter by a sheath fixedly connected to both such parts.

In the cutting of some materials a reciprocating blade which is merely cantilevered from the cutter head without being restrained at its bottom end may tend to deflect away from its desired cutting axis as it is moved through the layup and, therefore, may not provide a straight cut through the entire thickness of the layup causing a piece cut from an upper layer of the layup to differ in shape and size from a piece cut from a bottom layer of the layup. In accordance with one embodiment of this invention, therefore, the bottom member includes a guide which is engageable with the lower or bottom end of the blade and which guide is moved in unison with the movement of the upper portion of the cutter so that the blade is therefore supported and moved at both of its ends to prevent deflection of its lower end.

SUMMARY OF THE INVENTION

This invention resides in a cutting device for cutting sheet material such as fabric layups and wherein a supporting surface is provided for supporting the sheet material to be cut in a spread condition. A cutter head is located outwardly beyond the supporting surface and has a reciprocating cutting tool which extends toward the supporting surface so as to cuttingly engage the sheet material spread thereon. The cutter head is supported for movement both longitudinally and transversely of the supporting surface to enable the cutting tool thereof to follow any desired line of cut on the layup. Associated with the cutter head is a bottom member which moves over the supporting surface between it and the lower layer of the material to be cut. This bottom member is connected with the cutter head for movement longitudinally of the supporting surface in unison therewith and includes a slot extending transversely of the cutting table for accommodating the lower end of the tool. In accordance with various specific aspects of the invention this slot may include a transversely moving guide for engaging the lower end of the tool and driven transversely in unison with the transverse movement of the cutter head, may include a penetrable filling material such as a strip of bristles, a strip of foam plastic, or a strip of self-healing material, or may merely be an empty slot with the lower layer of the fabric layup being spread on top of a layer of heavy paper or cardboard or other relatively stiff expendable sheet material which supports the layup as it passes over the slot and provides an anvil surface for reacting the downwardly directed forces of the reciprocating tool.

BRIEF DESCRIPTION OF THE DRAWINGS

FIG. 2 is an enlarged plan view showing a portion of the cutting device of FIG. 1.

FIG. 3 is a still further enlarged vertical sectional view taken on the line 3—3 of FIG. 2.

FIG. 4 is a plan view taken on the line 4—4 of FIG. 3.

FIG. 5 is a view, somewhat similar to FIG. 2, but with various parts being broken away and with others being omitted to show various details of the cable drive system between the cutter head and the guide for the distal end of the cutter tool.

FIG. 6 is an enlarged vertical sectional view taken on the line 6—6 of FIG. 5.

FIG. 9 is a view similar to FIG. 8 but shows the cutting tool and sheath moved to a raised position above the top surface of the material to be cut.

FIG. 11 is a somewhat schematic view illustrating the cable mechanism utilized for moving the guide transversely and rotationally in unison with the transverse and rotational movement of the blade.

DESCRIPTION OF THE PREFERRED EMBODIMENTS

Figure 1:
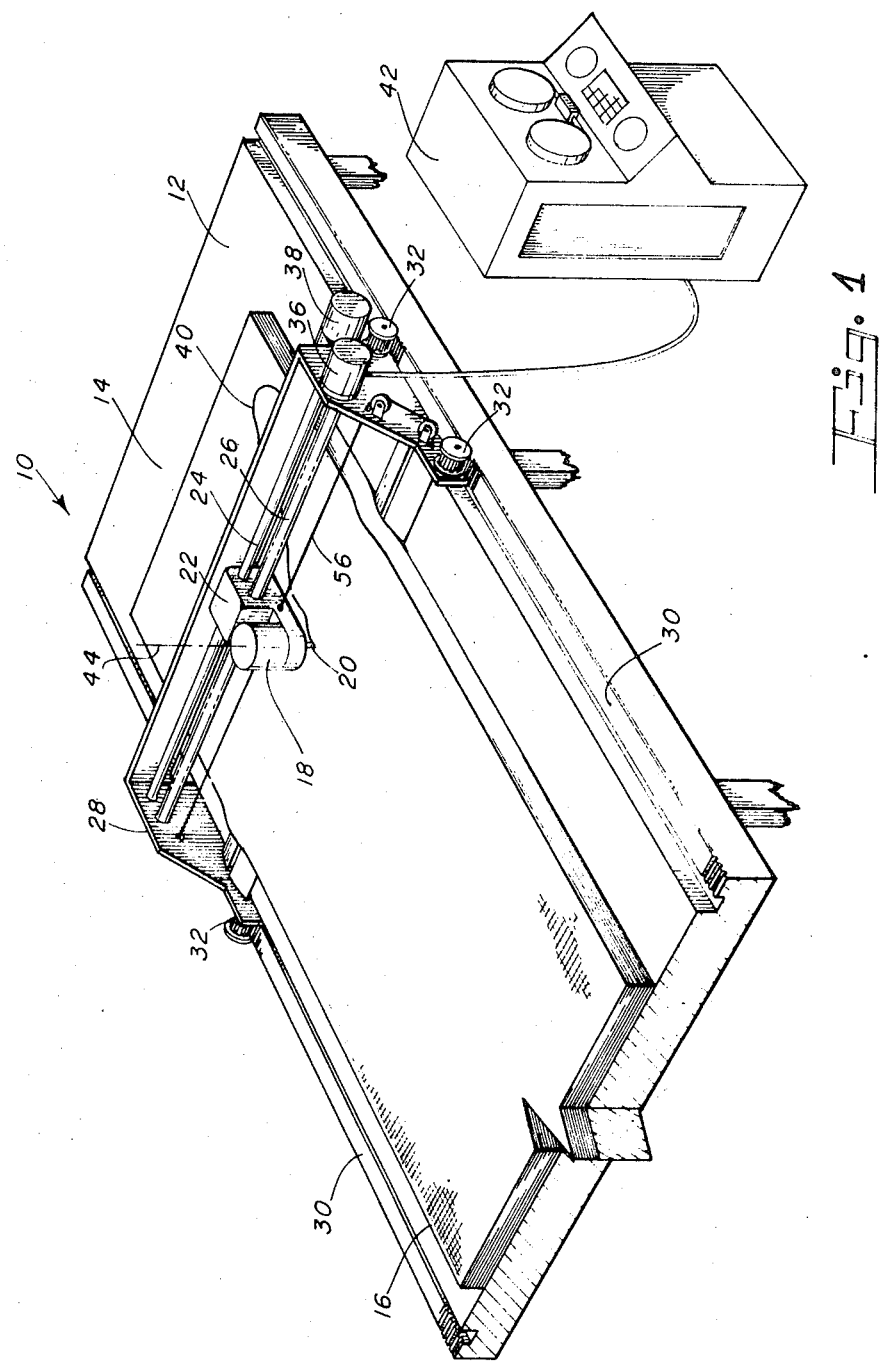
FIG. 1 is a perspective view showing a cutting device embodying this invention.

A cutting device embodying this invention and particularly adapted to the cutting of layups of fabric such as used for making clothing or upholstery is shown at 10 in FIG. 1. Considering FIG. 1 in more detail, the device 10 includes a table 12 having an upwardly facing flat supporting surface 14 for supporting the sheet material to be cut. In FIG. 1 such material is shown to consist of a layup 16 of a large number of individual layers of fabric spread over the supporting surface 14. The table 12 may be of a relatively long length and may be generally similar to the spreading and cutting tables presently often used in large scale cloth cutting operations. During the cutting operation, the layup 16 remains stationary on the supporting surface 14.

For performing the actual cutting of the layup 16 the device 10 of FIG. 1 includes a cutter head 18 which is supported above the surface 14 and includes a cutting tool in the form of a reciprocating blade 20 which extends downwardly from the cutter head toward the surface 14 so as to be cuttingly engageable with the layup 16. The cutter head 18 is mounted for movement transversely of the table 12 by being fixed to a sub-carriage 22 which in turn is supported for transverse movement relative to the table by suitable guide means such as a guide tube 24 and a lead screw 26. The guide tube 24 and lead screw 26 are supported and carried by a main carriage 28 which straddles the table 12 and is supported for movement longitudinally thereof by two racks 30, 30 on opposite sides of the table and toothed wheels or pinions 32, 32 carried by the carriage 28 and meshing with the racks. As shown best in FIG. 2, two of the pinions 32, 32, which are located on opposite sides of the carriage 28, are connected with one another by a transversely extending axle 34 to which both such pinions are fixed so as to be constrained to rotate in unison thereby maintaining the carriage 28 in true alignment with the longitudinal axis of the table 12 and preventing it from skewing.

Transverse movement of the cutter head 18 relative to the supporting surface 14 is obtained by rotating the lead screw 26 which is driven by an associated motor 36, and longitudinal movement of the cutter head relative to the table is obtained by a motor 38 which drives the axle 34 to cause both of the attached pinions 32, 32 to rotate and travel along the racks 30, 30 thereby moving the carriage 28 longitudinally. Therefore, it will be understood that by combined operation of the motors 36 and 38, the cutter head 18 may be caused to move along any desired line of cut in the plane of the supporting surface 14, one such line of cut being indicated at 40. Operation of the motors 36 and 38 is controlled by an associated automatic controller indicated at 42. The controller 42, may, for example, be a numerical controller operating in response to input information supplied by a magnetic tape reader, punched tape reader or other input device to drive the cutter head 18 along a desired line.

Of course, it should be understood that the illustrated means for moving the carriage 28 longitudinally of the table and the sub-carriage 22 transversely of the table are intended to be exemplary only and many other suitable and different constructions of such means may be employed without departing from the invention. For example, the drive for moving the carriage 28 longitudinally may, if desired, consist of only one rack and one pinion used in association with other means for guiding the carriage along a straight lontidudinal path without skewing.

Depending on various factors, such as the size, shape and material of the blade, the feed rate and the nature of the material being cut, the cutting blade 20 of FIG. 1 if unrestrained at its lower or distal end may, to an undesirable degree, tend to deflect away from its nominal cutting axis as a result of pressures applied thereto by the layup 16 and arising from movement of the cutter head relative to the layup. For example, from FIG. 1, it will be understood that if the lower end of the blade 20 is unrestrained and the cutter head is moved either to the left or right of the position shown, the blade as a result of its engagement with the layup will tend to deflect to the right or left by bending away from its nominal cutting axis. In FIG. 1, the nominal cutting axis is indicated generally at 44 and is the longitudinal axis of the blade when the blade is in its normal undeformed state. It will also be understood that the cutter head 18 includes a mechanism for both reciprocating the blade 20 and for rotating it about the nominal cutting axis 44 in order to maintain the blade generally tangent to the line of cut. It will also be appreciated that in order to cut through the full thickness of the layup it is necessary for the blade 20 in the lowermost extent of its stroke to extend at least slightly beyond the lower layer of the layup, and also at the cutting zone it is necessary for the bottom layer of the layup to be adequately vertically supported so that the blade when moving downwardly will move past and cut such layer rather than merely displace it downwardly.

In order to prevent deflection of the lower end of the blade while also supporting the material to be cut at the cutting zone and allowing the blade to move beyond the lower surface of the material, the device 10 in accordance with this invention includes a guide which is engageable with the lower end portion of the blade and which restrains such lower end portion to the position of the guide, the guide in turn being moved in unison with the movement of the cutter head 18 so that the lower end of the blade is supported by the guide and forced by the guide into alignment with the nominal cutting axis. Referring to FIGS. 2, 3 and 4, the guide in the illustrated case comprises a sheath 46 which not only engages the lower end portion of the blade but which may and preferably does, as shown, extend along the full length of the blade and is attached at its upper end to the cutter head 18. The sheath 46 includes a longitudinally extending slot which receives the major portion of the blade leaving the sharp edge 29 of the blade exposed. That is, the sheath engages both the rear edge and both lateral faces of the blade and prevents it from deflecting relative to the sheath both laterally and rearwardly.

At its lower end, the sheath 46 is fixed to a generally cylindrical head 48 which is received in a conforming circular recess in a guide block 50, the sheath 46 and head 48 therefore being free to rotate relative to the block 50 to permit rotation of the blade about the nominal cutting axis 44. The guide block 50 is received in a slot 52 in a bottom member 54, both of which extend transversely of the table, so that as the guide block 50 is moved along the length of the slot 52, the head 48, the sheath 46 and the lower end of the blade 20 are likewise moved transversely of the bottom member 54.

As shown in FIG. 1 the bottom member 54 is adapted to pass between the supporting surface 14 and the bottom surface of the layup 16. If desired, and as shown in FIGS. 3 and 4, means may be provided for ejecting air from the top surface of the bottom member to reduce the friction between the bottom member and the layup by creating an air cushion therebetween. Such means include a plurality of small orifices 72, 72 in the bottom member communicating with its top surface 73 and with air distributor channels 74, 74 passing transversely through the bottom member and connected to a suitable source of air under pressure.

To provide support for the material being cut at the cutting zone the guide block 50 has an upper surface 75 flush with the surface 73 and the circular head 48 likewise has an upper surface 77 flush with the surface 75, as best shown in FIG. 3. Also as shown in FIG. 3, which shows the blade 20 in the lowermost extent of its stroke, the circular head 48 accommodates the lower end of the blade and permits it to project beyond the lower surface of the material being cut.

The movement of the guide block 50 is coordinated with the movement of the cutter head 18 by a cable drive system illustrated best in FIGS. 5 and 6. Referring to these figures, a first cable 56 is connected at its opposite ends to opposite sides of the sub-carriage 22 and by means of pulleys 58, 58 on the main carriage 28 is trained into a loop including one straight section 60 which passes through an opening 62 in the bottom member 54. A second cable 64 has its opposite ends fixed to the opposite sides of the guide block 50 and is trained into a loop by two pulleys 66, 66 carried by the bottom member. The cable 64 therefore includes one straight section 68 which is also located in the opening 62 together with the section 60 of the cable 56. Within the opening 62 the two cables 56 and 64 are joined to one another by a connector 70. From FIGS. 5 and 6, it will therefore be obvious that as the cutter head 18 is moved to the right, the section 60 of its associated cable 56 is moved to the left and moved with the latter, through the connector 70, is the section 68 of the cable 64. This movement of the cable 64 therefore causes the guide block 50 to also be moved to the right in unison with the movement of the cutter head. Similarly, the movement of the cutter head to the left causes movement of the guide block 50 to the left to maintain it aligned with the cutter head.

Figure 7:
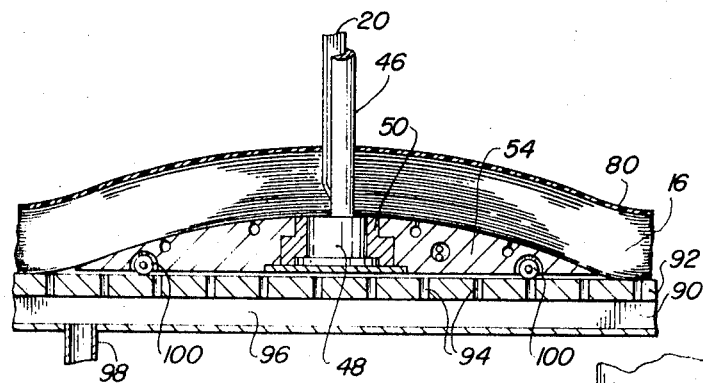
FIG. 7 is a view similar to FIG. 3 but shows another embodiment of the cutting device of this invention including a vacuum means for holding the material to be cut tightly in place on the supporting surface.

In the device 10 of FIGS. 1 to 6, the material to be cut, as evident from FIG. 1, is placed on the table 12 without the use of any supplementary means for holding it to prevent it from possibly shifting as a result of forces imposed thereon by the blade. If desired, however, the cutting device of this invention may include any suitable means for providing a holddown for the material to restrain it against shifting. A preferred form of such means is shown in FIG. 7 and consists of a sheet of air impervious material, such as a sheet of polyethylene, indicated at 80, spread over the top of the layup 16 and used in conjunction with a table 90 including means for supplying a vacuum to its supporting surface. Such vacuum supplying means may take many different forms, and in the illustrated case the table 90 includes a top plate 92 containing a large number of perforations or passageways 94, 94 which provide communication between the supporting surface and a vacuum chamber 96 located below the plate 92. The vacuum chamber 96 is, in turn, connected to a suitable source of vacuum by a conduit 98. As a result of the vacuum applied to the top or supporting surface of the plate by the apertures 94, 94, atmospheric pressure urges the air impervious overlying sheet 90 downwardly toward the supporting surface and compresses the layup 16 between it and the supporting surface to hold it relatively rigidly in place. Because of the increased pressure on the bottom member 54 due to the vacuum holddown, the bottom member, as shown in FIG. 7, preferably includes a number of wheels or rollers such as indicated at 100, 100 to enable it to be moved more easily relative to the table. The other portions of the cutting device shown in FIG. 7 are or may be similar to that shown in FIGS. 1 to 6, and in FIG. 7 those parts which are the same as corresponding parts of the device 10 of FIGS. 1 to 6 have been given the same reference numerals as the parts of FIGS. 1 to 6 and need not be further described.

In the device 10 of FIGS. 1 to 6, as well as the device illustrated in FIG. 7, it will be noted that the sheath 46 is vertically immovable and is fixed both to the cutter head 18 and the cylindrical head 48. Therefore, when initiating a cut with the device 10 it is necessary that such cut always be started from an edge of the layup 16. In many instances, it may be desirable to be able to initiate a cut from a point located at some distance from any edge of the layup, and to accomplish this it is necessary that the blade and its sheath, if any, be vertically movable relative to the supporting table and the fabric layup so that it may be moved upwardly to withdraw it entirely from the layup and then moved downwardly to make a stabbing or plunging cut into the material. A cutting device so designed is shown in FIGS. 8 to 11.

Figure 8:
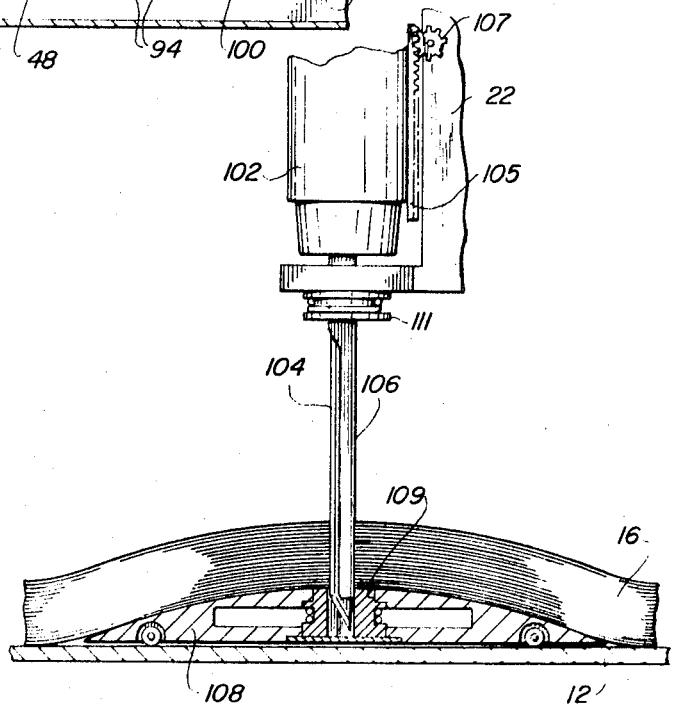
FIG. 8 is a view similar to FIG. 3 but shows a cutting device comprising still another embodiment of this invention.

Referring to FIGS. 8 to 11, the illustrated device includes a cutting table 12 and a cutter head 102, the cutter head having a vertically reciprocating blade 104 and an associated sheath 106. The table 12 is the same as the table 12 of FIG. 1 and the cutter 102 is or may be substantially similar to the cutter 18 of FIG. 1. The cutter head 102 is also movable longitudinally and transversely of the table 12 and the means for obtaining such movement are the same as those disclosed in FIG. 1, with the exception that the cutter head 102 is also supported for movement bodily vertically relative to the table 12 between a lowered position as shown in FIG. 8 and a raised position as shown in FIG. 9. For example, the cutter head 102 as shown in FIGS. 8 and 9 is moved vertically relative to the sub-carriage by a rack 105 fixed to the cutter head and a pinion 107 carried by the sub-carriage and driven by a motor on the sub-carriage.

The device of FIG. 8 includes a bottom member 108, generally similar to the bottom member 54 of the device 10, having a slot 109 therein extending transversely of the table and receiving a cylindrical guide member 110. The slot 109 of the bottom member 108 and the guide member 110 are so relatively shaped that the guide member is restrained to movement along the length of the slot 109 while also being free to rotate about a vertical axis.

Figure 10:
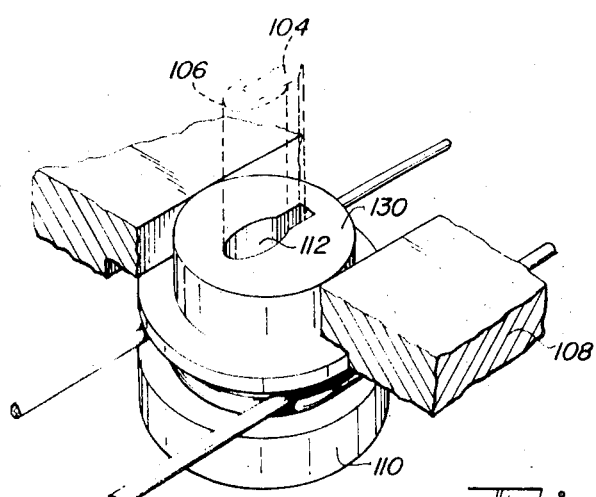
FIG. 10 is an enlarged perspective view of the tool guide used in the device of FIG. 8.

As shown in FIG. 10, the guide member 110 includes a vertically extending opening 112 having a shape conforming to that of the sheath 106 and also providing clearance for that portion of the blade 104 which projects forwardly beyond the sheath. When the sheath is in its lowered position, as shown in FIG. 8, the guide opening 112 receives the sheath and restrains its lower end to the position of the guide member. The sheath in turn restrains the blade 104, and as shown in FIG. 8 in the lowermost extent of its stroke the blade 104 extends into the guide member 110.

The guide member 110 is moved along the length of the bottom member 108 in unison with the corresponding movement of the cutter head 102 transversely of the table 12, and in addition to this movement it is also rotated about its vertical axis to maintain its opening 112 in proper angular position relative to the angular position of the blade 104 and sheath 108. That is, as the blade is rotated about a vertical axis the guide 110 is likewise rotated about a vertical axis in the same direction and to the same degree.

The means for moving the guide 110 to maintain it both angularly and laterally aligned with the blade and its sheath may take many different forms and may, for example, consist of a cable drive system generally similar to that shown schematically in FIG. 11. Referring to this figure, and also to FIGS. 8 and 9, the illustrated device includes a bushing 111 which is vertically fixed to the sub-carriage 22 but rotatable about a vertical axis. The blade and sheath 106 pass through a conforming opening in the bushing 111 and because of the noncircular cross-sectional shape of the sheath and the conforming opening in the bushing the bushing is rotated in unison with the rotation of the blade and sheath.

The bushing 111, as shown in FIG. 11, has trained about it two cables 113 and 115. To better distinguish the two cables from one another in FIG. 11 the cable 113 is shown in broken line and the cable 115 is shown in solid line. Both of the cables 113 and 115 are endless. The cable 113 extends from the bushing 111 to the right and passes over two pulleys 117, 117. From the pulleys 117, 117 it extends to the left and downwardly to two pulleys 119, 119, and from the pulleys 119, 119 it extends to the right to the guide member 110 about which it is trained. The cable 115 extends from the left of the bushing 111 to two pulleys 121, 121 and from such pulleys passes to the right and downwardly to two pulleys 123, 123. From the latter pulleys it passes to the left and is trained about the guide member 110. From a careful consideration of FIG. 11, it will therefore be obvious that as the bushing 111 is moved to the right or left, or in the illustrated Y direction, the cables 113 and 115 cause the guide member 110 to also be moved in the Y direction in unison with the movement of the bushing. Similarly, as the bushing 111 is rotated about the illustrated vertical axis $\theta$, by rotation of the blade and sheath, the cables 113 and 115 cause the guide member 110 to also be rotated about the axis $\theta$ to maintain it angularly aligned with the bushing. Of course, it should be understood that FIG. 11 is intended to be schematic only and in an actual device additional pulleys may be used to guide the cables in paths somewhat different from those shown.

From the foregoing consideration of the device illustrated in FIGS. 8 to 11, it will be appreciated that the blade 104 and its sheath 106 may be moved downwardly from a position above the layup 16, as illustrated in FIG. 9, while the blade is reciprocated to cause the blade to move in a plunging fashion through the layup. As the lower end of the blade and its sheath reach the guide member 110, the guide member will be properly oriented to receive the blade and the sheath, the blade being received in the guide member when in the lower extent of its stroke, as shown in FIG. 8. Thereafter, as the blade is moved along a desired line of cut the guide member 110 is moved transversely of the table in unison with the transverse movement of the cutter head 102 to restrain the lower end of the sheath and the blade to the position of the cutter head and to thereby prevent deflection of the blade and consequent cutting errors. Also, the guide 110 includes an upwardly facing surface 130 which is flush with the top surface of the bottom member 108 and which acts to support the material being cut at the cutting zone to react the downward forces imposed thereon by the blade, thereby assuring that the bottom layer or layers of the material will be properly cut rather than being merely displaced into the slot 109.

Figure 12:
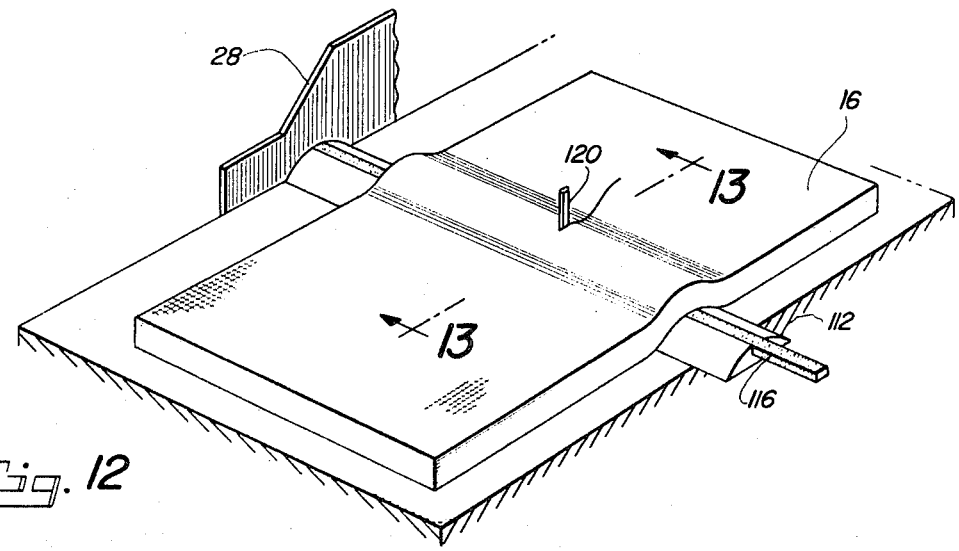
FIG. 12 is a fragmentary perspective view of a cutting device comprising another embodiment of this invention.
Figure 13:
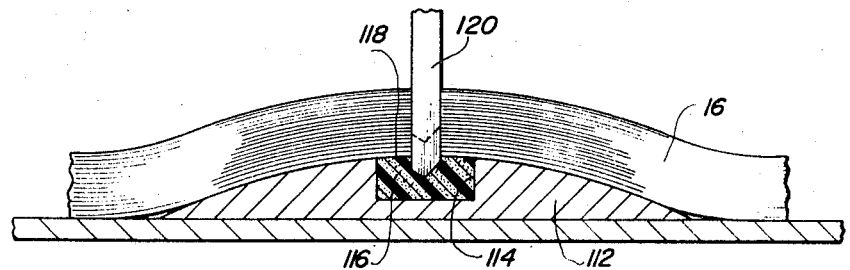
FIG. 13 is a sectional view taken generally on the line 13—13 of FIG. 12.

In the devices described above, the free or distal end of the cutting blade has been restrained to movement in unison with the cutter head, by a cooperating guide in the bottom member moved in unison with the transverse movement of the cutter head, to prevent undesired deflection of the blade. This deflection of the blade may not, however, be a problem in some instances, and when this is the case, the guide member may, if desired, be omitted and the bottom member used principally to accommodate that portion of the blade which projects below or beyond the bottom surface of the layup during the cutting operation. For example, FIGS. 12 and 13 show a cutting device which is similar to the device 10 of FIGS. 1 to 6, except for the construction of the various parts shown in these figures. More particularly, the cutting device illustrated by these figures includes a bottom member 112 attached to the carriage 28 for movement longitudinally of the table in unison with the longitudinal movement of the cutter head (not shown). The bottom member 112 includes an upwardly opening slot 114 which receives a strip of foamed plastic such as foamed polyethylene. The strip of plastic 116 has an upper surface 118, generally flush with the upper surface of the remainder of the bottom member 112, which provides a support for the lower layers of the layup 16 in the vicinity of the slot 114. Additionally, the foamed strip 116 is readily penetrable by the cutting blade, illustrated at 120, the solid lines in FIG. 13 showing the blade 120 in the lower extent of its stroke and the broken lines showing it in the upper extent of its stroke. The blade 120, as shown in FIG. 13, is used without an accompanying sheath but if desired a sheath generally similar to the sheath 106 of FIG. 8 may be employed.

From FIGS. 12 and 13, it will be appreciated that during a cutting operation the blade 20 during at least a portion of its stroke extends beyond the lower layer of the layup and projects into the foamed strip 116 which accommodates the projecting part of the blade while nevertheless providing, by the surface 118, a support for the material at the cutting zone so as to react the downward forces of the blade and to prevent the material from being displaced by being pushed into the slot 114 by the blade. The blade is, of course, also preferably movable vertically in addition to its reciprocating moment to enable it to be withdrawn from and plunged into the material being cut so as to enable a cut to be started from any point on the layup.

Figure 14:
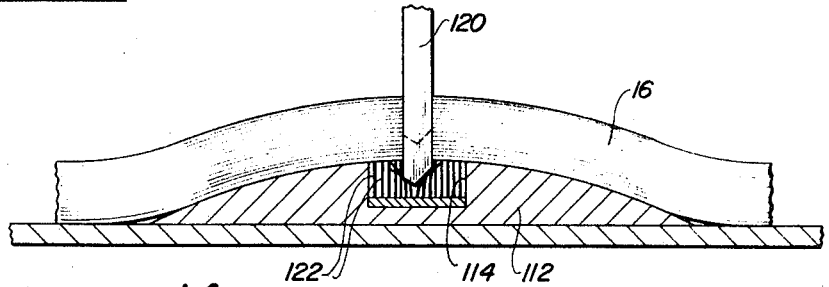
FIG. 14 is a sectional view generally similar to FIG. 13 but showing a cutting device comprising another embodiment of this invention.
Figure 15:
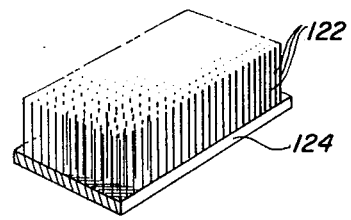
FIG. 15 is a fragmentary perspective view showing a portion of the bristle element used in the device of FIG. 14.

The foamed plastic strip 116 of FIGS. 12 and 13 is representative of a large number of different penetrable materials which may be used to fill the slot 114 of the bottom member. For example, in addition to the foamed plastic, the slot may be filled with a self-healing material such as that commonly referred to as "Silly Putty," or a granular material such as sawdust. FIGS. 14 and 15 show a cutting device wherein the bottom member 112 has its slot 114 filled with another preferred form of filling material constituting a plurality of bristles 122, 122. As shown in FIG. 15, the bristles 122, 122 are part of a brushlike member having a base 124 which receives and holds the lower ends of the bristles 122, 122, with the bristles 122, 122 projecting upwardly therefrom and having their free ends located in a common plane substantially flush with the remainder of the surface of the bottom member 112 so that the bristles in unison support the lower layers of the layup 16 overlying the slot 114. As the blade 120 moves beyond the lower surface of the layup, it passes into the bed of bristles 122, 122, and the bristles being flexible tend to deflect laterally to accommodate the blade without being cut by the latter.

Figure 16:
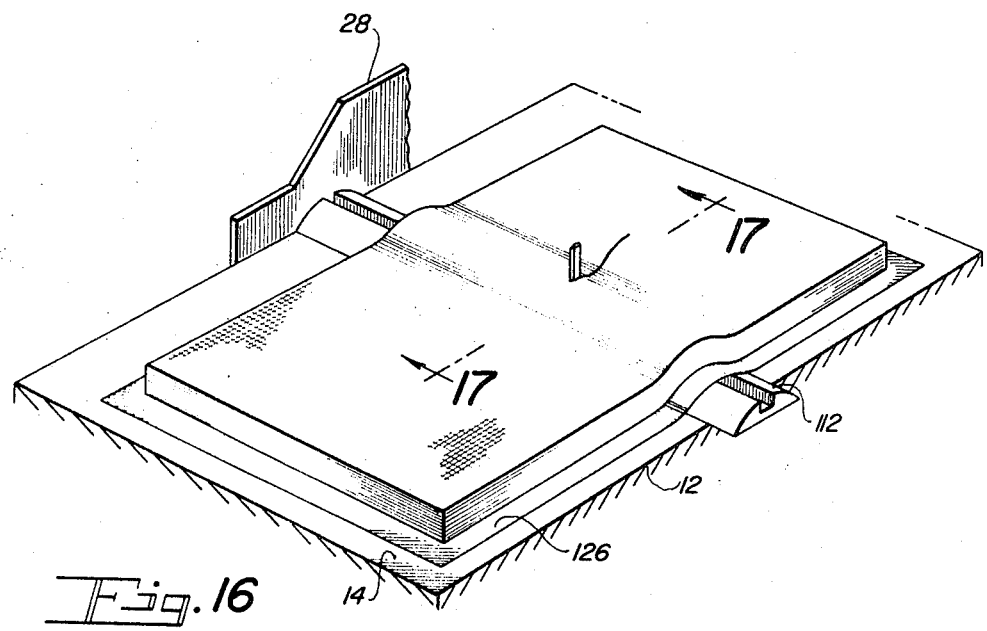
FIG. 16 is a fragmentary perspective view generally similar to FIG. 12 but showing a device comprising another embodiment of this invention.
Figure 17:
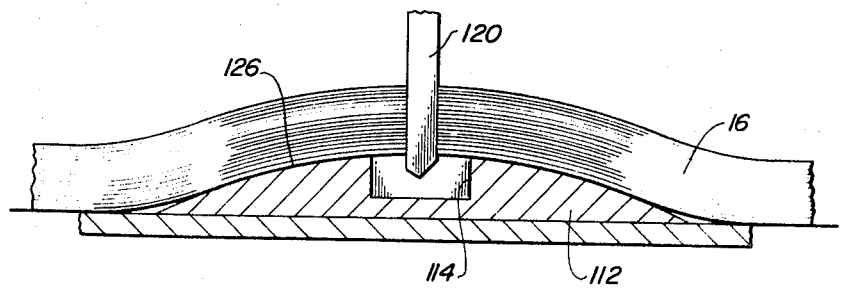
FIG. 17 is a sectional view taken generally on the line 17—17 of FIG. 16.

In addition to the slot of the bottom member being filled with a penetrable material, it may also in some instances be left empty. For example, if the material being cut is relatively stiff the tendency of the blade to push the material into the slot of the guide member during its downstroke may not be sufficiently great to present any problems. Also, if the material is not sufficiently stiff by itself to prevent its being pushed into the slot, the layup of material on the cutting table may be underlaid by a layer of expendable stiff material, such as stiff paper or cardboard, to provide a backing preventing the material from moving into the slot and providing resistance to the downward forces of the blade. This construction is shown in FIGS. 16 and 17. Referring to these figures, the bottom member 112 has its slot 114 empty and the layup 116 is superimposed on a layer of stiff paper 126. That is, in spreading the material on the cutting table the layer 126 of paper is first laid down and then the various layers of material are laid up on top of it. Both the paper 126 and layup 116 pass over the top of the bottom member 112 and as is evident from FIG. 17 the paper layer 126 provides support for the bottom layers of the layup 16 to prevent them from being pushed into the slot 114 by the downward movement of the blade 120.

I claim:

1. A cutting device for cutting sheet material, said device comprising means providing a supporting surface for supporting sheet material to be cut in a spread condition, a cutter head located outwardly beyond said supporting surface, said cutter head having a cutting axis arranged generally perpendicular to said supporting surface and having a cutting tool which extends generally along said cutting axis toward said supporting surface so as to be cuttingly engageable with the sheet material spread thereover, means supporting said cutter head for movement both longitudinally and transversely relative to said supporting surface in a plane generally parallel thereto, a bottom member extending transversely of said supporting surface and adapted to reside between said supporting surface and the sheet material spread thereon, and means for moving said bottom member longitudinally of said supporting surface in unison with the movement of said cutter head longitudinally of said supporting surface, said bottom member having a slot therein extending transversely of said supporting surface and aligned with the path of said cutting tool as said cutter head is moved transversely of said supporting surface for receiving the distal end portion of said cutting tool.

2. A cutting device for cutting sheet material as defined in claim 1 further characterized by said slot in said bottom member being filled with a means providing a surface facing said cutter head for supporting the material located over said slot and which surface is penetrable by said cutting tool.

3. A cutting device for cutting sheet material as defined in claim 2 further characterized by said means filling said slot being a body of foamed plastic.

4. A cutting device for cutting sheet material as defined in claim 2 further characterized by said means filling said slot being a body of self-healing material.

5. A cutting device for cutting sheet material as defined in claim 2 further characterized by said means filling said slot being a plurality of bristles having fixed ends located at the base of said slot and having free ends located at the mouth of said slot.

6. A cutting device for cutting sheet material as defined in claim 1 further characterized by means including an automatic controller for moving said cutter head relative to said supporting surface so as to cause said cutting tool to follow a desired line of cut relative to the sheet material spread over said supporting surface.

7. A cutting device as defined in claim 1 further characterized by said bottom member having a top surface engageable with said sheet material, and means for ejecting air from said top surface of said bottom member to reduce the friction between said top surface and said material.

8. A cutting device as defined in claim 1 further characterized by said means supporting said cutter head for movement both longitudinally and transversely relative to said supporting surface including a carriage movable longitudinally of said supporting surface, said bottom member being fixed to said carriage so as to be moved longitudinally of said supporting surface in unison with the longitudinal movement of said cutter head.

9. A cutting device as defined in claim 1 further characterized by means for moving said cutting tool along said cutting axis toward and away from said supporting surface to enable it to be withdrawn from the material being cut and plunged into said material at any point thereon to initiate a line of cut.

10. A cutting device for cutting sheet material, said device comprising means providing a supporting surface for supporting sheet material to be cut in a spread condition, a cutter head located outwardly beyond said supporting surface, said cutter head having a cutting axis arranged generally perpendicular to said supporting surface and having a cutting tool which extends generally along said cutting axis toward said supporting surface so as to be cuttingly engageable with the sheet material spread thereover, means supporting said cutter head for movement transversely relative to said supporting surface in a plane generally parallel thereto, and means defining a slot located below the material spread on said supporting surface and extending transversely of said supporting surface and aligned with the path of said cutting tool as said cutter head is moved transversely of said supporting surface for receiving the distal end portion of said cutting tool, said slot having a width longitudinally of said supporting surface slightly larger than and of the same order of magnitude as the maximum dimension of said cutting tool in the plane of said supporting surface, and said slot being filled along substantially its entire length and width with a means providing a surface facing said cutter head for supporting that portion of said sheet material which is located over said slot and which latter surface is penetrable by said cutting tool and is stationary longitudinally of said supporting surface relative to said cutter head.

11. A cutting device for cutting sheet material as defined in claim 10 further characterized by said means filling said slot being a body of foamed plastic.

12. A cutting device for cutting sheet material as defined in claim 10 further characterized by said means filling said slot being a body of selfhealing material.

13. A cutting device for cutting sheet material as defined in claim 10 further characterized by said means filling said slot being a plurality of bristles having fixed ends located at the base of said slot and having free ends located at the mouth of said slot.

* * * * *